United States Patent [19]

Arai et al.

[11] 4,259,007

[45] Mar. 31, 1981

[54] PHOTOGRAPHIC APPARATUS

[75] Inventors: Toshio Arai, Kawasaki; Shunzo Inoue, Yokohama; Yasuo Kuroda, Sagamihara; Michio Kasuya, Fuchu; Motofumi Konishi, Yokohama; Mitsuo Nakamura, Chofu, all of Japan

[73] Assignee: Canon Kabushiki Kaisha, Tokyo, Japan

[21] Appl. No.: 73,484

[22] Filed: Sep. 7, 1979

[30] Foreign Application Priority Data

Sep. 14, 1978 [JP] Japan ................................ 53-113040
Sep. 14, 1978 [JP] Japan ................................ 53-113041

[51] Int. Cl.³ ....................... G03B 27/32; G03B 27/52
[52] U.S. Cl. ......................................... 355/27; 355/64
[58] Field of Search ...................... 355/21, 27, 28, 64, 355/65

[56] References Cited

U.S. PATENT DOCUMENTS 4,013,360   3/1977   Burke et al. ........................... 355/27
4,158,496   6/1979   Cieplik ................................. 355/27 X

FOREIGN PATENT DOCUMENTS 2627118   12/1976   Fed. Rep. of Germany ............ 355/27

Primary Examiner—Richard A. Wintercorn
Attorney, Agent, or Firm—Fitzpatrick, Cella, Harper & Scinto

[57] ABSTRACT

This invention provides a photographic apparatus for successively photographing originals on a photographic film in a continuous web form and subsequently developing the thus exposed film. Said apparatus comprises a camera unit and a processor unit, wherein said camera unit comprising a film chamber for storing the photographic film exposed at an exposing position into a loop form, a feed path for feeding said film in said film chamber into said processor and means for advancing said film into said film chamber. The photographic apparatus of this invention is selectively usable either as a camera for photographing only or as a camera-processor for continuous photographing and development.

12 Claims, 22 Drawing Figures

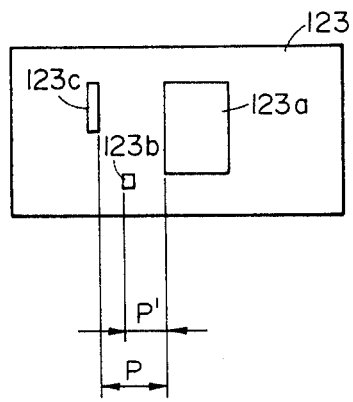
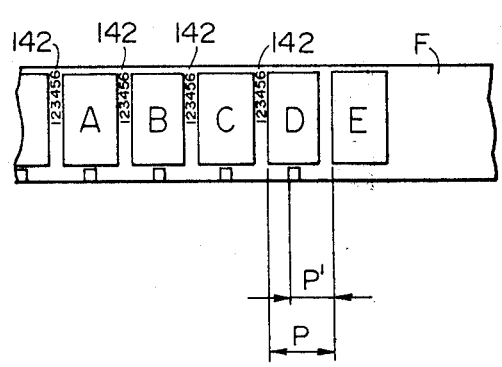
FIG. 4  FIG. 5
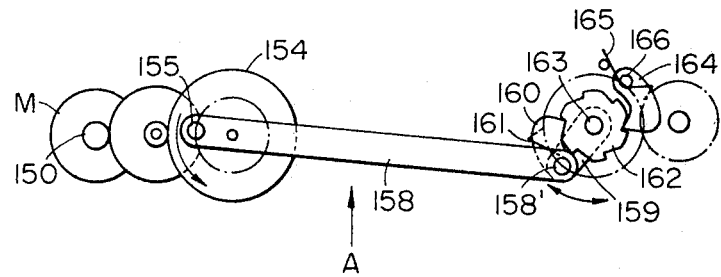
FIG. 6
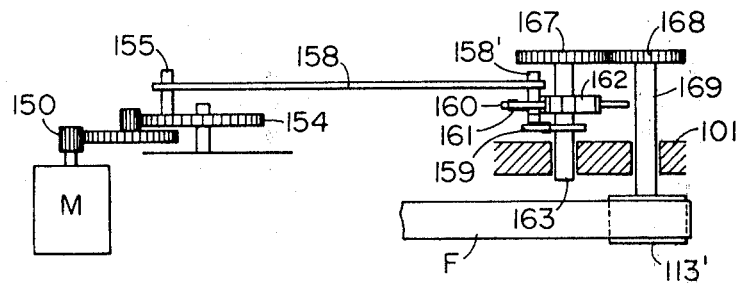
FIG. 7

PHOTOGRAPHIC APPARATUS

BACKGROUND OF THE INVENTION

1. Field of the Invention

The present invention relates to a photographic apparatus for successively exposing originals onto a photographic film of a continuous web form and subsequently processing the thus exposed photographic film thereby obtaining a photographic film with visible images thereon.

2. Description of the Prior Art

The photographing of originals on a photographic film and the processing of the thus exposed film has been usually achieved by a separate camera and processor, wherein a roll of photographic film is at first exposed to a plurality of originals in the camera, then taken out from said camera upon completion of the exposure of said roll and transferred to the processor for developing. Such method requires a long access time from the photographing to the processing since the processing operation can only be conducted after a roll of film is completely exposed, and necessitates cumbersome operations such as loading and removal of the film into or from the camera and film loading into the processor.

In order to prevent the above-mentioned drawback there has been already known a photographic apparatus for continuous photographing and processing, wherein the photographic film exposed in the camera unit is temporarily stored in a film storage chamber provided between the camera unit and the processor unit and is supplied from said film storage chamber into the processor unit. However, such photographic apparatus, though convenient in case of continuous operation from photographing to processing, is unable to conduct the photographing operations alone in case such operations are needed, and is inconvenient for transportation and storage because of bulky integral structure including the camera and processor.

SUMMARY OF THE INVENTION

The object of the present invention is to provide a photographic apparatus capable of preventing the above-mentioned drawbacks.

Another object of the present invention is to provide a photographic apparatus capable of performing either the photographing operation only or the photographing and processing operation in automatic and consecutive manner.

Still another object of the present invention is to provide a photographic apparatus allowing easy handling and transportation.

BRIEF DESCRIPTION OF THE DRAWINGS

FIG. 4 is a front view of the aperture plate;

FIG. 5 is a front view of the photographic film;

FIG. 6 is a partial lateral view of the drive mechanism for the camera unit;

FIG. 7 is a plan view of said drive mechanism shown in FIG. 6;

DESCRIPTION OF THE PREFERRED EMBODIMENTS

Now the present invention will be described in detail by the following explanation taken in conjunction with the attached drawings.

Figure 1:
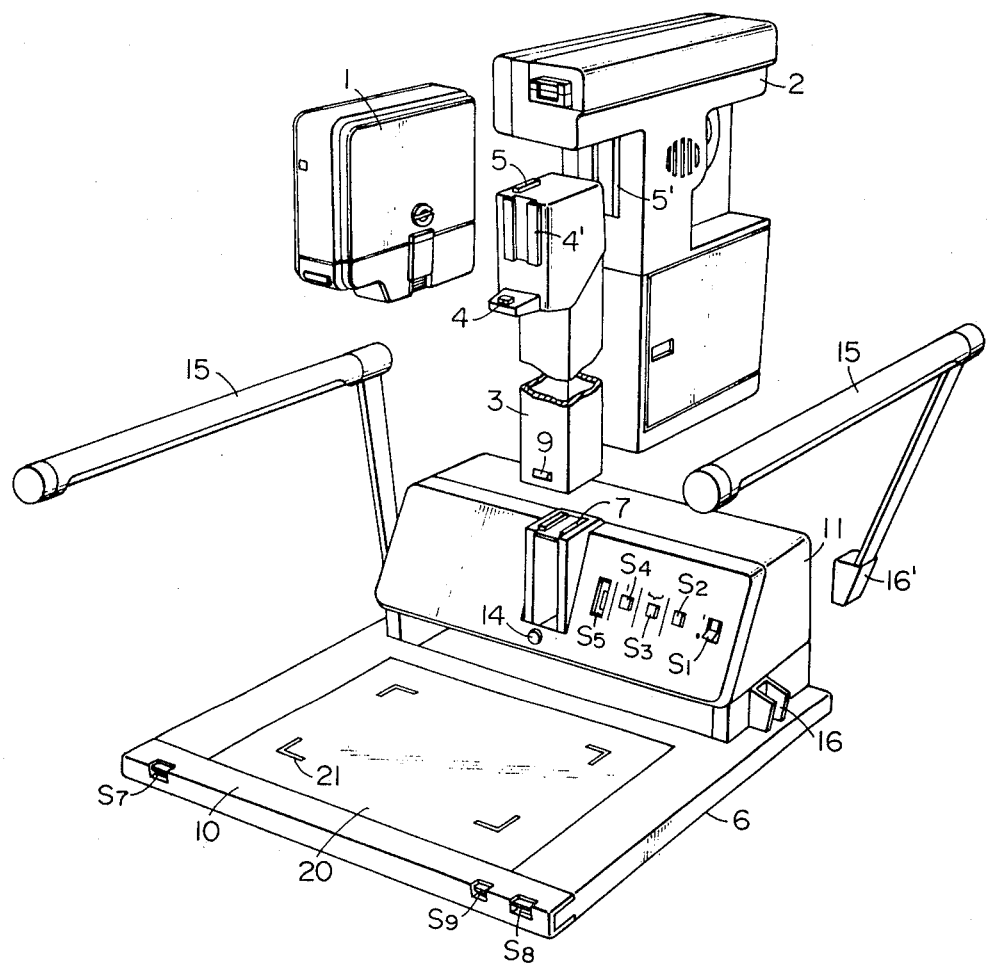
FIG. 1 is a perspective view of a processor-camera embodying the present invention.

FIG. 1 shows a processor-camera embodying the present invention wherein various units illustrated in exploded manner being structured detachably mountable on the support, and being supported by said support and rendered operable when mounted on said support.

In FIG. 1, 1 is a camera unit comprising the sections of unexposed film storage, exposure, film drive, film storage, picture taking lens etc. to be explained later, while 2 is a processor unit comprising the sections of liquid processing, film drive, drying, winding, liquid temperature control, liquid circulation, etc. Said camera unit 1 and processor unit 2 are detachably mountable on a pillar unit 3 and electrically and mechanically connected through connectors 4, 4', 5 and 5'. Said pillar 3 is detachably mounted on a support 6 and electrically and mechanically connected thereto through a connector 7. The pillar unit 3 is provided with a feed display lamp 9. The support 6 is provided with an object support section 10 and a control section 11, of which front panel is provided with a power switch S1, a feed switch S2 for advancing the photographic film by a predetermined amount without a photographic operation, a select switch S3 for automatically step advancing or retaining the content of a counter provided on the front face of the camera unit, another select switch S4 for photographing a retrieval mark and the content of said counter on the photographic film, and an exposure multiplication switch S5 for extending a preset exposure time by a determined multiplication factor.

Numeral reference 14 is a photoreceptor for measuring the light for illuminating the original, thereby controlling the exposure time of the shutter.

Numeral reference 15 are light source units detachably mountable on the support 6 through connectors 16, 16' providing electrical and mechanical connections thereto. Said original support section 10 of the support is provided with a flat sheet 20 for placing thereon an object to be photographed and having thereon frame marks 21 indicating the coverage of photographing field. Said original support section is also provided with a space switch S7 for advancing the photographic film by one frame without photographing operation, photographed a shutter switch S8, and a counter inverting switch S9 for inverting the selected state of said switch S3 temporarily for one exposure.

The above-explained processor-camera thus comprises the camera unit 1 and processor unit 2 both detachable, by way of the pillar unit 3, from the support 6, and can therefore be used as a microfilm camera without processor function when the camera unit 1 alone is mounted on the pillar unit 3. It is therefore possible to selectively use plural camera units of different image reduction rates according to the desired image reduction rate. In such case the frame marks 21 on the sheet 20 indicating the coverage of photographing field should be displaced according to the image reduction rate of each camera unit, and for this reason the sheet 20 is exchanged corresponding to the camera unit in use.

Now there will be given an explanation on the details of said camera unit, while making particular reference to FIGS. 2 to 7.

Figure 2:
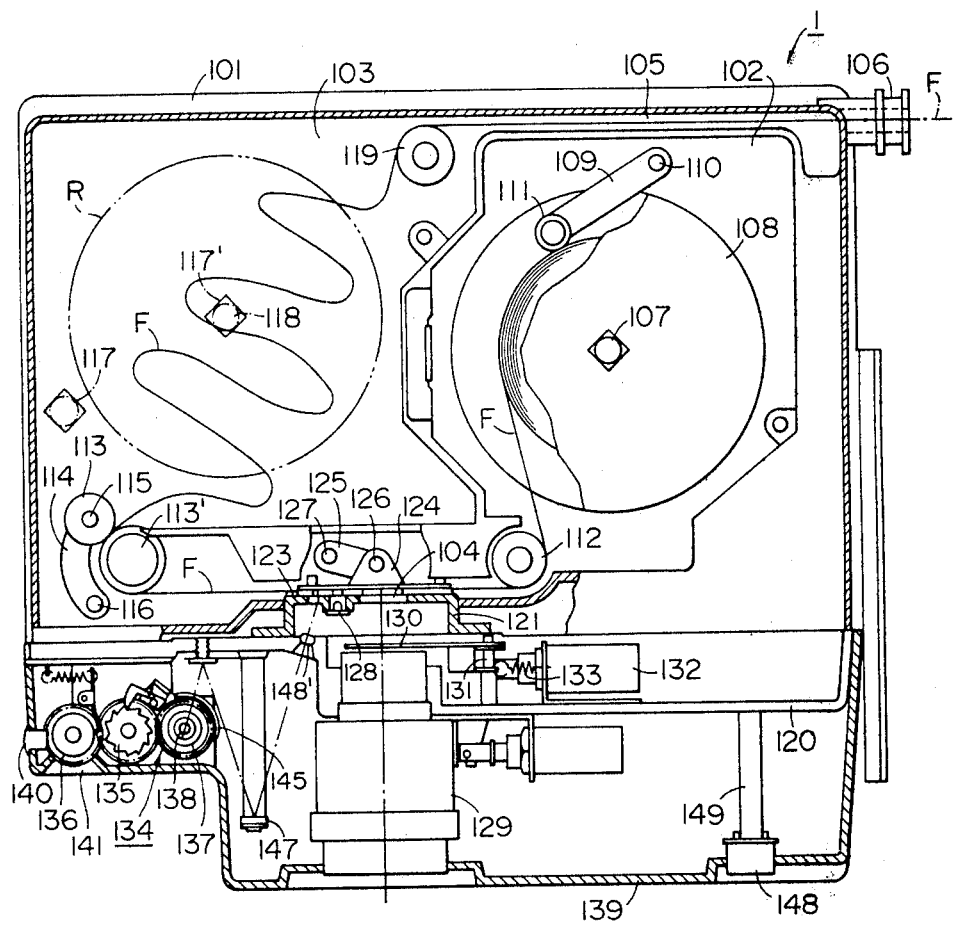
FIG. 2 is a front cross-sectional view of the camera unit.

In FIG. 2, an upper body 101 of the camera unit 1 is divided, by means of a partition wall parallel to the paper plane, into a front chamber accommodating a film storage section, an exposure section and a film path, and a rear chamber accommodating a drive mechanism for driving the camera unit. Said front chamber is further divided by a central partition wall into an unexposed film storage chamber 102 at the right-hand side and an exposed film storage chamber 103 at the left-hand side, and an exposure section 104 for photographing operation is provided approximately between and under said chambers 102 and 103. Above said unexposed film storage chamber 102 there is formed a film transport path 105 leading from said exposed film storage chamber 103 to the processor unit 2 through a connection tube 106. Approximately in the center of said unexposed film storage chamber 102 there is mounted, on the upper body 101, a feed shaft 107 in a rotatable manner with a certain frictional resistance for supporting a reel 108 for unexposed photographic film, which is fitted on said shaft 107 without mutual rotation for example by engagement of a square-sectioned shaft with a square hole on the reel. Said chamber is also provided with a lever 109 for detecting the remaining amount of the film wound on the reel 108, said lever 109 being biased anticlockwise by a spring about a shaft 110 positioned at an end and being equipped at the other end with a roller 111 rotatable in contact with the outer periphery of the film wound on the reel 108. There are also shown a guide roller 112 for the film F, a capstan roller 113′ and a pinch roller 113. Said pinch roller 113 is rotatably supported on a shaft 115 mounted on a lever 114 which is in turn provided with a shaft 116 fitted into a hole in the upper body 110 and resiliently biased clockwise, thereby maintaining the film F in pressure contact with said capstan roller 113′. An adapter 17 is used for mounting a winding reel, said adapter being mounted on a drive shaft 18 in the chain-lined position 117′ when the camera unit is used singly without the processor unit, i.e. when the exposed film is to be wound on a winding reel, but being shifted to a full-lined corner position 117 from said drive shaft 118 in case the camera unit is used as the processor-camera in combination with the processor unit, wherein the exposed film is stored in a looped state in said chamber. On the other hand, in case of the use of the camera unit alone, the exposed film is stored in said chamber in a rolled state on the winding reel. Consequently said chamber should be provided with a dimension at least capable of accommodating the winding reel. Said drive shaft 118 is recessed from said chamber so as not to hinder loop formation, so that said adapter 117 is to be inserted into a hole provided in said shaft 118 in case of mounting the winding reel. Said adapter is naturally so designed as to allow easy attachment on and detachment from the drive shaft 118 by the user. A guide roller 119 is provided for guiding the film in said chamber 103 toward the processor unit through the film transport path 105 and connection tube 106.

Under the upper body 101 there is mounted a lower body 120 having an aperture box 121 fixed in the approximate center thereof. On the upper face of said aperture box 121 there is mounted an aperture plate 123, and a pressure plate 124 for maintaining the photographic film F in planer contact with said aperture plate at the exposure is supported by loose fitting on a pin 126 projecting at an end of a lever 125. Said lever 125 is provided at the other end thereof with a shaft 127 fitted in a hole in the partition wall of the body and biased clockwise by a spring located in the rear chamber. Said aperture plate 123 is provided, as shown in FIG. 4, with an aperture 123a for defining the photographing field of the object, a mark recording window 123b and a frame number recording window 123c. In FIG. 2 128 is a light-emitting diode functioning as the light source for mark recording and positioned directly under said mark recording window 123b. The lower body 120 is further provided with a picture-taking lens 129 positioned below the aperture 123a and a shutter blade 130 positioned between said aperture 123a and said lens 129 for interrupting the light from the lens 129 to the film F through the aperture 123a except for the moment of photographic exposure. Said shutter blade 130 is rendered rotatable about a shutter shaft 131 protruding from the lower body 120 and is retracted, at the exposure, from the effective light path of the lens 129 by the energization of a shutter solenoid 132 in response to a signal from the control section 11 of the support. A return spring 133 is provided for said shutter blade, and 134 is a decimal counter for counting the photographed frames and composed of six parallel by arranged number rings 136 for displaying six digits. Said counter not only displays a number through a window 141 provided in a part of a bottom cover 139 but also allows the recording of the same number on the film as a frame number 142 positioned adjacent to the image area (cf. FIG. 5). For this purpose there are provided six number recording rings 137 each made of semi-transparent plastic material and each provided on the outer periphery thereof with numerals 0 to 9 at equal distances and in negative patterns, i.e. translucent patterns on opaque background. A lamp 138 controlled by a signal from the control section 11 is provided inside said rings 137 to illuminate said patterns from the inside and to record said patterns on the photographic film, and 145 is a shield plate having an aperture for transmitting the light from only one numeral in a determined position on each ring 137 thereby preventing the leakage of unnecessary light to the photographic film. The light passing through said aperture on the shield plate 145 is projected onto the film F through a first mirror 146, a second mirror 147, an image focussing lens 148 and the window 123c of the aperture plate 123 and thus recorded as the frame number 142 in a position between adjacent frames. For driving said numbers rings 136 and number recording rings 137 there are provided drive wheels 135 each of which is composed of a 10-tooth ratchet wheel and a gear meshing with gears provided on said number rings 136 and number recording rings 137, all said gears being naturally of a same number of teeth. The periphery of the gear of each number ring 136 is partially exposed in the recess 141 in the bottom cover 139, whereby the user can set an arbitrary number with the fingertip.

A connector 148 is fixed on the lower body 120 by means of a support 149 for transmitting the electric signals from the control section 11 to the camera unit 1.

Figure 3:
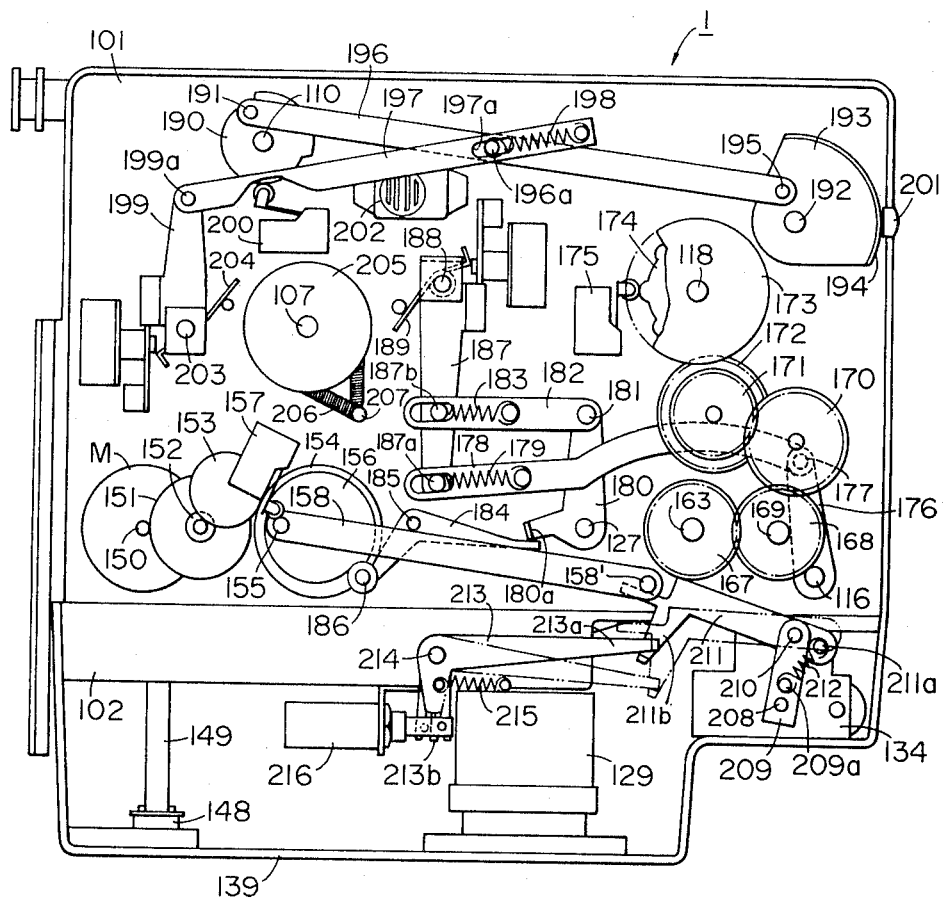
FIG. 3 is a rear cross-sectional view of the camera unit.

FIG. 3 shows the rear chamber located at the back of the camera unit shown in FIG. 2, wherein there are shown a drive motor M, a pinion 150 mounted on the drive shaft of said motor, a series of gears 151-154 for reducing the revolution of said drive motor M, in which the final one 154 is integrally provided with a drive pin 155 and a cam 156 for actuating the pressure plate shown in FIG. 2, and a microswitch 157 to be actuated by said pin 155 upon each full rotation of the gear 154 to send a signal to the control section to stop said gear 154 after each full rotation. Upon each full rotation of the gear 154, a connecting rod 158 linked at an end thereof to said pin 155 causes a clockwise rotation of a gear 167 at the right-hand side by 60°, thereby advancing the film F by a frame pitch (p in FIG. 5) through the capstan 113' (FIG. 2) fixed on a shaft 169 of a gear 168 meshing with said gear 167. Also through a series of gears 170-172, the gear 168 drives a gear 173 and an integral cam wheel 174, said gear 173 being integrally fixed to said drive shaft 118. Said cam wheel 174 actuates a microswitch 175 for detecting the film advancement at an interval corresponding to the flim advancement of 10 mm. In the present embodiment the capstan 112 is of a diameter of 19.1 mm, thus advancing the film by 60 mm in a full rotation of the gear 168. On the other hand the cam wheel 174 is provided with eight teeth to actuate the microswitch 175 eight times in one full rotation. Consequently the ratio of rotation of the gears 168 and 173 is maintained at 8:6 by the gears 170-172.

FIGS. 6 and 7 show a mechanism for intermittent film advancement by a determined length, wherein FIG. 7 is a view seen from the direction of arrow A in FIG. 6. As explained in the foregoing, the gear 154 is rotated in the direction of arrow by the drive motor M and through the reducing gears, and is stopped upon completion of a full rotation by the cooperation of the pin 155 and microswitch 157 shown in FIG. 3. On the other hand the shaft 163 of the gear 167 at the right-hand side is provided with an integral ratchet wheel 162 and is loosely fitted with an end of a swinging arm 159, which is provided at the other end thereof with a pin 158' functioning as the rotating axis for a ratchet pawl 160 constantly pressed against the periphery of said ratchet wheel 162 by the function of a twist spring 161. Another ratchet pawl 164 of the same shape as the pawl 160 is fitted on a fixed shaft 166 protruding from the upper body 101 and constantly pressed against the periphery of said ratchet wheel 162 by a twist spring 165 prevents the reverse rotation of the ratchet wheel 162. The pin 158' on said swinging arm 159 and the pin 155 on the gear 154 are respectively fitted into the end holes of the rigid connecting rod 158. Therefore, upon full rotation of the gear 154, the swinging arm 157 performs a reciprocating cycle within the range of arrow a (ca. 65°), thus rotating the ratchet wheel 162 by the angle of one tooth (60°). More in detail, during the initial half rotation of the pin 155 (in the lower half portion) the pin 158' is displaced to the right but the ratchet wheel 162 remains in stopped state because of the slippage between the ratchet wheel 162 and the ratchet pawl 160. However, during the latter half rotation of the pin 155, the pin 158' is shifted to the left within the range of arrow a to cause rotation of the ratchet wheel 162 in the clockwise direction through the engagement of the ratchet pawl 160 with the teeth of the ratchet wheel 162. Said rotation is transmitted to the gear 168 meshing with the gear 167 integrally mounted on the shaft 163 of the ratchet wheel, whereby the film F is advanced by a determined amount by the capstan roller 113' mounted on the shaft 169 of said gear. In the field of 16 mm film to be employed in the present embodiment, the advancement pitches of 10 mm and 11.75 mm are popular though there exist other various formats. In the present embodiment, the advancement of 10 mm or 11.75 mm can be easily achieved with the capstan roller of a diameter of 19.1 mm and the 6-toothed ratchet wheel by choosing the tooth ratio of the gears 167 and 168 respectively equal to 1:1 (=50:50) in pitch 10 mm or 1:1.175 (=46:54) in pitch 11.75 mm. Again referring to FIG. 3, 176 is a pressure lever for the pinch roller 113 (FIG. 2), said lever being biased anticlockwise (clockwise in FIG. 2) about the shaft 116 by means of a pin 177 fixed on an end of said lever, a lever 178 engaging with said pin and a tension spring 179.

A pressure lever 80 is used for the pressure plate 124 (FIG. 2), said lever being biased anticlockwise (clockwise in FIG. 1) about the shaft 127 by means of a pin 181 fixed on an end of said lever 180, a lever 182 engaging with said pin and a tension spring 183.

A pressure release lever 184 is provided rotatably about a shaft 185 mounted on the body 101, and is provided on an end thereof with a roller 186 to be maintained in contact with the outer periphery of a cam 156. Thus during a period approximately corresponding to a half rotation of the gear 154, the larger radius portion of said cam 156 rotates the lever 184 anticlockwise, whereby the other end thereof lifts an end portion 180a of a lever 180 to turn the shaft 127 in clockwise against the biasing force of the spring 183 thereby releasing the pressure plate 124 from the film on the aperture plate 123. This function is conducted only when the film F is advanced, and said film is constantly maintained in pressure contact with the aperture plate 123 by means of said pressure plate 124 as long as the film is not in transportation.

A lever 187 rotatably supported on a shaft 188 mounted on the body 101 is provided with pins 187a, 187b slidably engaging respectively with elongated holes of the levers 178, 182. Said lever 187 is biased anticlockwise about said shaft 188 by means of a torsion spring 189, but is maintained in a position shown in FIG. 3 when a not-shown lid of the film chamber at the front side is closed. Upon opening of said lid for film loading into the film storage chamber, said lever 187 is released and rotated anti-clockwise by said torsion spring 189 to rotate the levers 176, 180 clockwise, thereby retracting the pinch roller 113 and the pressure plate 124 from the feed path of the film F, thus facilitating the film loading.

A cam 190 for indicating the remaining amount of the film is fixed on the shaft 110 of the aforementioned lever 109 for detecting the remaining amount of the film (FIG. 2). A sector-shaped member 193 at right side is rotatably supported on a pin 192 mounted on the body 101 and is provided, on the arch-shaped lateral face, with a film amount scale 194 which is readable through a transparent window 201 provided on the body 101.

Said cam 190 and the sector-shaped member 193 are respectively provided with pins 191, 195 which are mutually connected by a connecting rod 196 having holes on both ends thereof for rotatably engaging with said pins. Said connecting rod 196 is biased to the right by means of a tension spring 198 linked to a pin 196a fixed at the approximate center of said connecting rod, whereby said cam 190 and sector-shaped member 193 being biased clockwise. The shaft 110 supporting said cam 190 is provided on the other end thereof with the lever 109 (FIG. 2), of which end roller 111 maintained in contact with the film F wound on the reel 108 determines the rotational position of the cam 190 and sector-shaped member 193. In this manner the amount of rotation of said cam 190 and member 193 is determined by the radius of the film wound on the reel 108, and the amount of film remaining in the film storage chamber 102 can be known from the reading of the film amount scale 194. Furthermore, when said radium becomes smaller than a predetermined amount, said cam 190 actuates a microswitch 200 to sound an alarm by a buzzer 202, thereby informing the shortage of film in the film storage chamber 102.

A lever 199 rotatably supported on a shaft 203 mounted on the body 101 and provided thereon with a pin 199a engaging with an end hole of a lever 197 is biased anticlockwise about a shaft 203 by means of a torsion spring 204, but is maintained in a position shown in FIG. 3 as long as the not-shown lid of the film storage chamber at the front side is closed. Upon opening of said lid for film loading, said lever 199 is released and rotated anti-clockwise by the function of said torsion spring 204 to displace the lever 197 toward left, whereby the aforementioned connecting rod 196 is likewise moved to the left as the pin 196a abuts with the right-hand end of the elongated hole 197a. The resulting anticlockwise rotation of the shaft 110 causes the lever 109 to displace outwards from the outer periphery of the reel 108, thus facilitating the removal and mounting of said reel 108 on the shaft 107. A coil spring 206 hooked at both ends thereof on a pin 207 fixed on the body 101 is wound around a V-shaped pulley 205 fixed on said film supply shaft 107 provides an appropriate back tension to the film by the friction between said spring and the groove of said pulley 205, thus preventing the slack of the film.

A drive shaft 208 for the counter 134 shown in FIG. 2, when externally rotated by approximately 40°, rotates the drive wheel 135, number ring 136 and number recording ring 137 for the lowest digit by 36° (i.e. 1/10 of a full turn) to step advance the number represented by counter, and returns to the original position by means of a not-shown spring upon termination of the external driving force. The wheels of the second lowest digit are rotated by 36° upon repetition of the above-explained procedure by 10 times, while the wheels of the third lowest digit are rotated by 36° upon repetition of the above-explained procedure by 100 times, and so on. These mechanisms are already known in the art and will not therefore be explained in detail.

Members 209, 210 and 211 are provided for supplying the drive force to said counter, wherein 209 being a counter drive lever integrally mounted on said drive shaft 208, and 210 being a pin protruding from the push rod 211 and rotatably fitted in a hole provided at an end of said counter drive lever 209. Because of the presence of a tension spring 212 hooked at an end thereof on a pin 211a at the right-hand end of said push rod 211 and at the other end on a center pin 209a of said counter drive lever 209, said push rod 211 is biased clockwise about the shaft 210 but is retained in the illustrated position by the abutting engagement with the lower side of the film drive pin 158'.

Upon rotation of the motor M of the camera unit in response to an instruction from the control section 11, the pin 155 makes a full rotation about the shaft of the gear 154, during the former half of which the pin 158' is caused to displace to the right along the arc around the shaft 163 by approximately 65° by means of the connecting rod 158, whereby said pin 158' engaging with the left shoulder of the push rod 211 to displace said push rod 211 likewise to the right, thus driving the counter drive shaft 208 clockwise by the counter drive lever 209 and step advancing the counter 134. When the pin 155 subsequently enters the upper half of rotation, the pin 158' is then shifted toward left, whereupon the push rod 211, counter drive lever 209 and counter drive shaft 208 are returned to the original position by means of not-shown return springs.

A counter release lever 213 to be used in case of film advancing without corresponding counter advancing is rotatably supported in the center on a shaft 214 mounted on the lower body 102 and maintained by a tension spring 215 in such a manner that the right end portion of said lever 213 is in a horizontal position. Also the other end portion 213b extending downwards of said lever 213 is connected to the plunger of a solenoid 216. Thus, in case the film F is to be advanced without advancing the counter, said solenoid 216 is energized simultaneously with the power supply to the motor M, whereby said plunger is retracted to rotate the counter release lever 213 to a position represented by the double chain line. Consequently said right end portion 213a engages with a folded portion 211b of the counter push rod 211 to lower said push rod 211 to the double chain-lined position, thereby retracting the shoulder portion thereof from the engagement with the pin 158' at the rightward displacement. In this manner the motor advances the film without advancing the counter.

Figure 8:
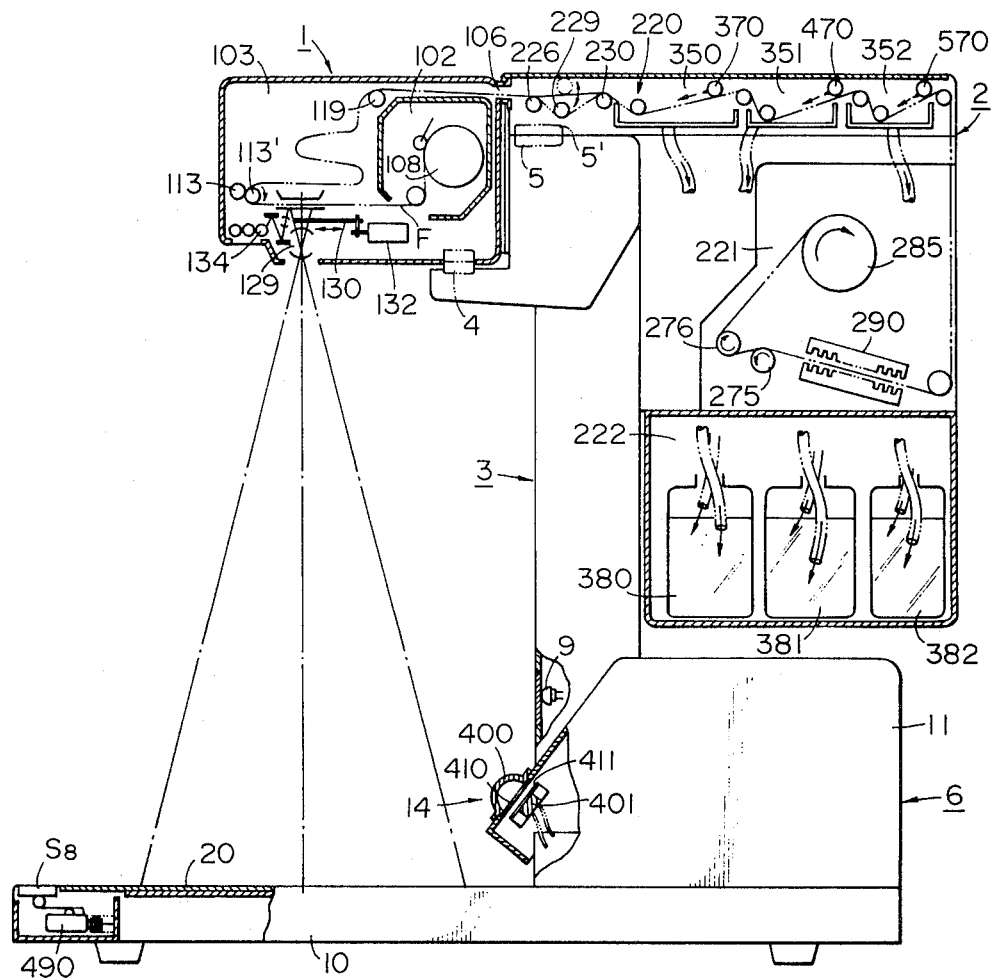
FIG. 8 is a cross-sectional view of the essential portion of the processor-camera.

FIG. 8 shows a state in which various units are connected to the support. The camera unit 1 is connected by the connecting tube 106 to the film inlet of the processor unit 2, thus forming a continuous film transport path therebetween. Also the camera unit and processor unit are electrically connected to the support 6 through the connector 148 of the camera unit and the connector 5' of the processor unit respectively connected to the connectors 4, 5 of the pillar unit. Said processor unit 2 comprises the sections of liquid processing 220, drying and winding 221, liquid storage 222, drive etc.

The details of said processor unit are shown in FIGS. 9 to 18.

Figure 9:
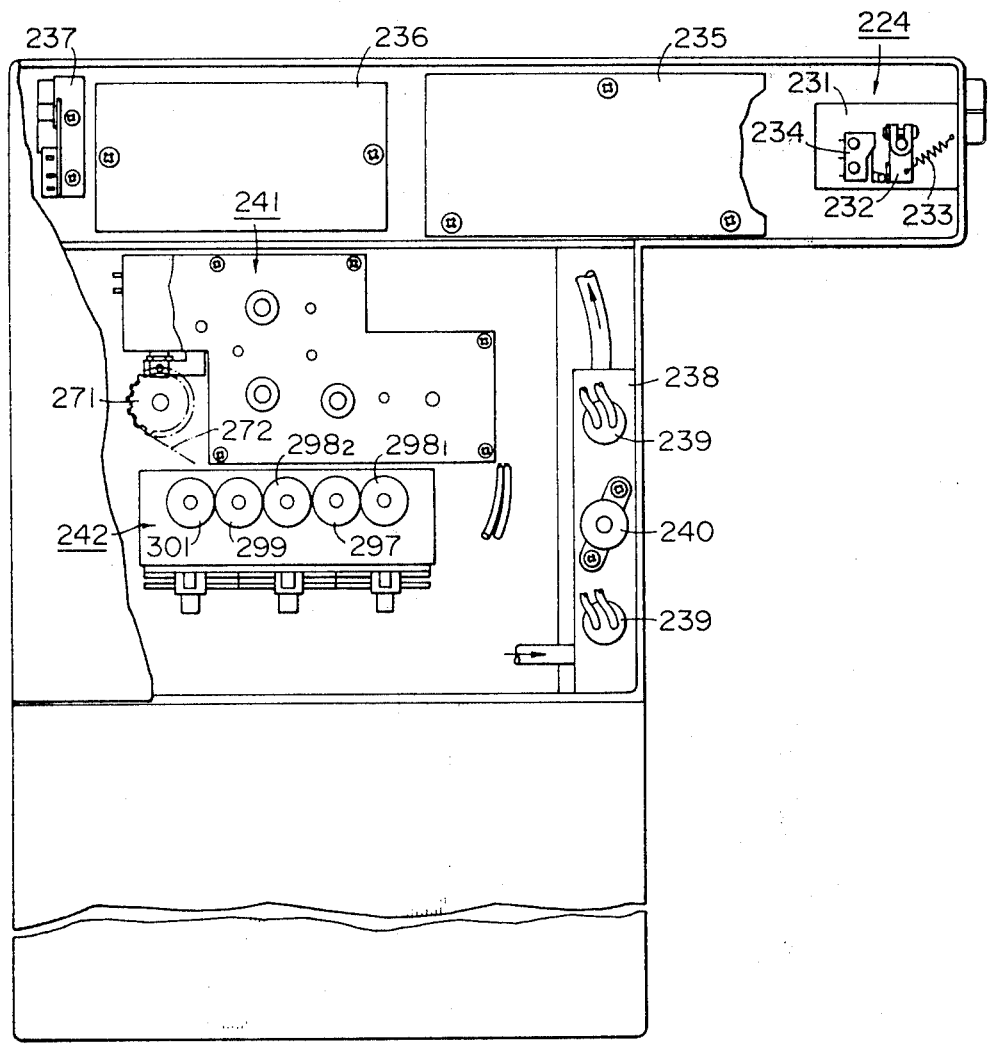
FIG. 9 is a rear view of the processor unit.
Figure 12:
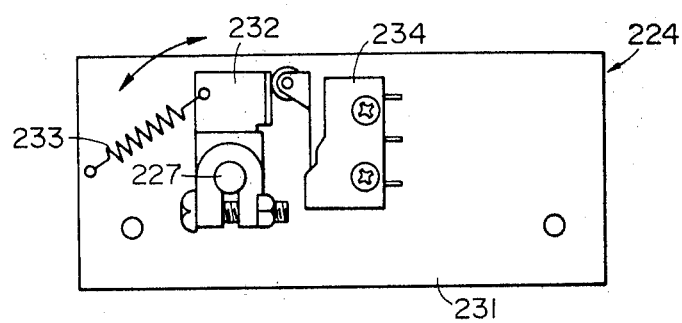
FIG. 12 is a rear view of the loop detector.
Figure 13:
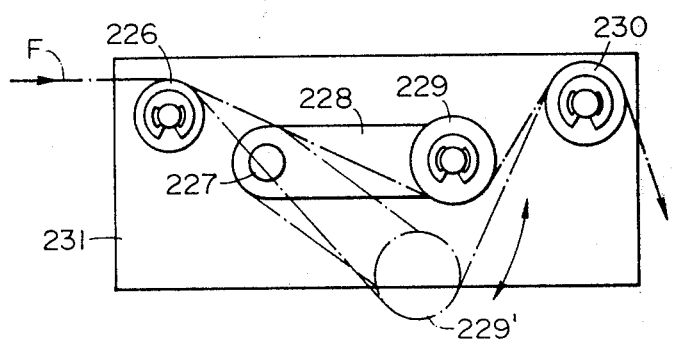
FIG. 13 is a lateral view of the loop detector.

FIG. 9 shows a rear chamber located at the rear side of the processor unit 2 shown in FIG. 8, wherein 224 is a loop detector positioned immediately behind the film inlet of the processor unit for detecting the slack state of the film loop stored in the film chamber 103 of the camera unit, the details of said detector being shown in FIG. 12 and 13.

Now referring to FIG. 13, the film F introduced into the processor unit 2 through the film chamber 103 of the camera unit, connecting tube 106 and the inlet of said processor unit is guided through a guide roller 226, a movable guide roller 229 mounted on an arm 228 oscillating around a shaft 227 and another guide roller 230, wherein the shaft of said rollers 226, 230 being mounted on a support plate 231 while the shaft 227 being rotatably supported by said support plate 231.

In FIG. 12 showing the rear side of said support plate 231, a lever 232 is fixedly mounted on the shaft 227 and is biased anticlockwise about the shaft 227 by means of a tension spring 233 and 234 is a microswitch for loop detection which is to be closed when the arm 228 in FIG. 13 is in the full-lined position.

In case the film loop present in the film chamber 103 of the camera unit is in excess of a predetermined amount, said movable guide roller 229 is located in the chain-lined position 229' since, because of the slack film loop, the lever 232 is rotated by the tension spring 233 about the shaft 227 to cause clockwise rotation of the arm 228 in FIG. 13, wherein the microswitch 234 being in the off state not actuated by the lever 232.

On the other hand when the film loop present in the film chamber of the camera unit becomes less than a predetermined amount, the film F is tensioned in the advancing direction by the film drive roller in the processor unit to displace the roller 229 from the chain-lined position to the full-lined position with the anticlockwise rotation of the arm 228, whereby the microswitch 234 is actuated to generate an electric signal indicating the decrease of the film loop.

In FIG. 9 there are shown a temperature control section 235 for processing liquids, a control unit 236 for the drive motor of the processor unit, a door switch 237 for detecting the state of the not-shown light-tight lid of the liquid processing section which is to be opened in case of film loading into the processing unit 2, a heating block 238 for controlling the temperature of the processing liquids wherein said liquids being heated to a determined temperature during passage through narrow channels provided in said block, a cartridge heater 239 for heating said block, a thermostat 240 for interrupting the power supply to said cartridge heater in case the block is overheated, a drive mechanism 241, and a pump mechanism 242 for supplying processing liquids from respective containers to appropriate processing sections to be driven by said drive mechanism 241.

Figure 10:
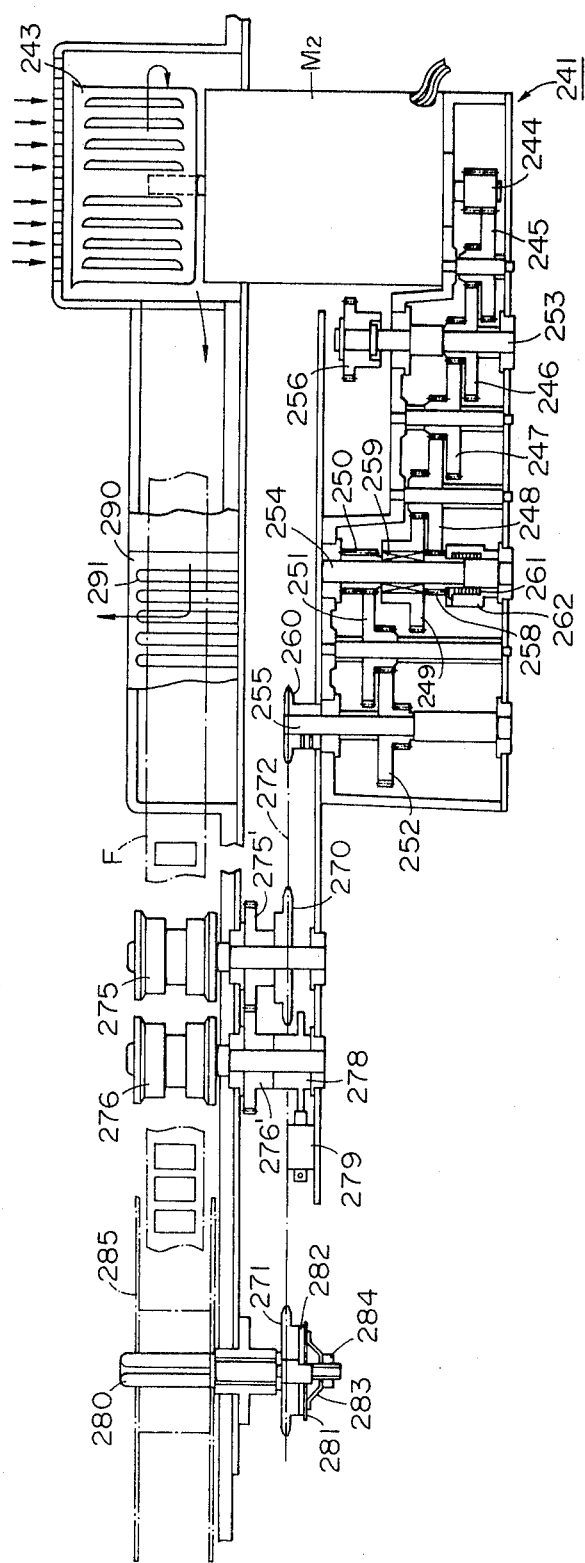
FIG. 10 is a partial cross-sectional view of the drive mechanism.

Said drive mechanism will be clarified in detail by the following explanation relating to FIG. 10.

Figure 11:
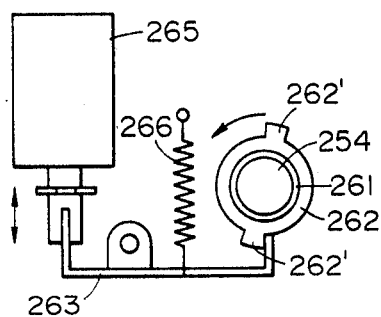
FIG. 11 is a partial lateral view of the speed changeover mechanism.

The various sections of the processor unit, including a film drying fan, the pump mechanism for liquid circulation, a film drive roller and a film winding section are driven by a single motor M2 having the shafts extended on both ends thereof, one of which is provided with a sirocco fan 243 while the other of which is provided with a pinion 244, of which rotation is transmitted to a film drive gear 252 through reducing gears 245-251 designed for a reduction rate of 1/10 in 2-step reduction. The second gear 246 is fixed on a pump drive shaft 253 while the fifth gear 249 and the small gear 250 are mounted on a speed changeover shaft 254, and the film drive gear 252 is fixed on a film drive shaft 255. The pump drive shaft 253 and the film drive shaft 255 are respectively provided with a pump drive gear 256 and a ladder wheel 260 fixed thereon, while the speed changeover shaft 254 is provided with a slip gear 258 rotatably mounted thereon. Said fifth gear 249 is linked to the speed changeover shaft 254 through a one-directional clutch 259 in such a manner that said gear 249 engages with said shaft 254 when rotated anticlockwise to transmit the power to said shaft. Said slip gear 258 is fitted in a left-wound clutch spring 261 which is hooked at an end thereof on a control ring 262, whereby said clutch spring being disconnected from the slip gear 258 when the rotation of said control ring is arrested. Consequently though said clutch spring 261 is fitted on the speed changeover shaft 254, the stopping of the rotation of said control ring 262 causes slippage between the shaft 254 and the spring 261, thus allowing free rotation of said shaft 254 with respect to the slip gear 258. On the other hand when the control ring 262 is freed in the rotating direction, the clutch spring 261 is tightened on the slip gear 258 to connect the spring with the shaft 254. In this manner the transmission of rotation from the gear 258 to the shaft 254 can be controlled by the control on the rotation of said control ring 262. FIG. 11 shows a mechanism for controlling said control ring, wherein the rotation of said ring can be arrested by the engagement of a projection 262' provided on the ring 262 with a control lever 263. Said lever 263 is connected at the other end to a speed changeover solenoid 265, which, when energized, rotates the lever 263 to disengage said lever 263 from the projection 262'. Upon deactivation of the solenoid 265, the lever 263 returns to the original position by means of a tension spring 266 to restore said engagement, thus interrupting the rotation of the control ring.

When the control ring 262 is arrested, the slip gear 258 is driven by the fourth gear 248 but the rotation is not transmitted to the shaft 254 because of the slip state of said gear 258. Consequently the rotation of the gear 249 meshing with the reducing gear 248 is transmitted through the one-directional clutch 259 to the speed changeover shaft 254 to drive the small gear 250 fixed thereon, thereby driving the film drive shaft 255 through the gears 251 and 252.

Thus the number of revolution of the film drive shaft 255 is reduced to $1/(\sqrt{10})^7 = 1/3162$ of the number of revolution of the motor M2 (low speed).

On the other hand when the solenoid 265 is energized to disengage the projection 262' from the lever 263, the clutch spring 261 becomes engaged with the slip gear 258 and the speed changeover shaft 254, whereby the rotation of said slip gear 258 is transmitted to the speed changeover shaft 254.

In this state, the fifth gear 249 is driven by the fourth gear 248, but the rotation of said fifth gear 249 is not transmitted to the speed changeover shaft 254 as the clutch 259 does not engage with the shaft 254 because of the revolution of the slip gear 259 higher by ca. 3.16 times than that of the fifth gear 249. In this manner the shaft 154 driven by the slip gear 254 drives, by way of the gears 250, 251 and 252, the film drive shaft 255 at a higher revolution corresponding to $1/(\sqrt{10})^5 = 1/316.2$ of the revolution of the motor M2 (high speed).

Stated differently, the angular velocity of the film drive shaft 255 in this state is ten times higher than that when the rotation of the control ring 262 is stopped. Thus it is possible to achieve a speed changeover of 1:10 on the film drive shaft by simply activating or deactivating the solenoid to control the rotation of the control ring 262 while the motor M2 is rotated at a constant speed.

Again referring to FIG. 10, the ladder wheel on the film drive shaft 255 is connected, by means of a ladder chain 272, with a ladder wheel 270 linked to the film drive roller and a ladder wheel 271 linked to the film winding shaft.

Film drive rollers 275 and 276 are of the same material and of the same diameter (19.1 mm) as the capstan roller 113' in the camera unit, and are positioned in the winding-drying section 221 as shown in FIG. 8. No film drive rollers are provided in the processing section 220.

Said drive rollers 275, 276 are respectively provided, on the shafts thereof, with gears 275', 276', and the roller 276 is further provided with a cam wheel 278.

Consequently said drive rollers 275, 276 are driven by the ladder wheel 260 through the ladder chain 272, ladder wheel 270 and gears 275', 276'. The cam wheel 278 is provided on the periphery thereof with six projections at equal intervals for actuating a microswitch 279 for detecting film advancement, whereby a pulse signal being generated by said microswitch 279 for each 1/6 rotation of the drive rollers 275, 276, corresponding to the advancement of the film by 10 mm as already explained in connection with the camera unit.

A film winding shaft 180 is provided with a friction plate 281 rotating integrally with said shaft 280 but is displaceable in the axial direction.

On the other hand the ladder wheel 271 is provided with a friction member 282 adhered thereto and is rendered freely rotatable with respect to said winding shaft 280.

Said friction plate 281 is pressed against said friction member 282 by means of a plate spring 283 under a pressured rendered adjustable by a screw 284 mounted on said shaft 280.

Consequently the winding shaft 280 is driven by the ladder chain 272 through the ladder wheel 271, friction member 282, and friction plate 281. A film winding reel 285 is detachably fitted on said winding shaft 280 so as to rotate integrally therewith, thereby taking up the processed film thereon. The drive transmission to the winding shaft through the friction plate and the friction member is to provide slippage therebetween for compensating the change in the film winding speed on the film winding reel 285 resulting from the change in the diameter of film on said reel.

A sirocco fan 243 mounted on the other end of said driven by the motor M2 guides the air suctioned from an air inlet through a not-shown guide section of the processor unit to the film drying section. A heating member is provided on the path of said air to supply hot dried air to said film drying section thereby easily and rapidly drying the wet film after the processing and rinsing.

Figure 17:
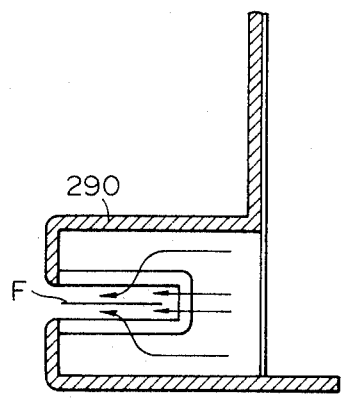
FIG. 17 is a partial cross-sectional view of the drying chamber.

A film drying chamber 290 is provided with slit apertures 291 extending in a direction perpendicular to the advancing direction of the film. As detailedly shown in FIGS. 16 and 17, the hot dried air flows in the drying chamber along the arrows, brought into contact with the film from the apertures 291 and emitted from the chamber after contact with the film. As shown in FIG. 17, the dried air flows, on the film surface, in a direction approximately perpendicular to the advancing direction of the film.

Such structure for blowing hot dry air in the transversal direction of the wet film allows efficient drying within a short time in comparison with the conventional structure for blowing dry air along the advancing direction of the film since the wet air after contact with the film is immediately emitted to the outside and the film is constantly maintained in contact with the hot dry air.

Figure 14:
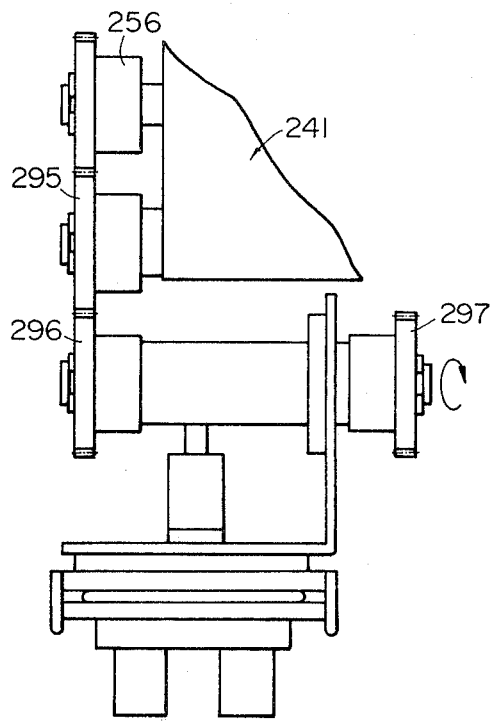
FIG. 14 is a partial front view of the pump drive transmission.
Figure 15:
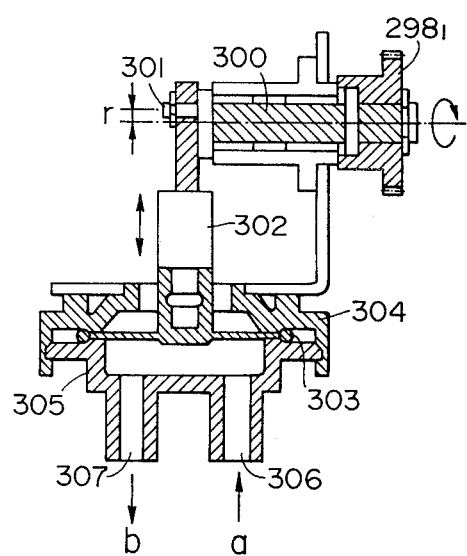
FIG. 15 is a partial cross-sectional view of the pump mechanism.
Figure 16:
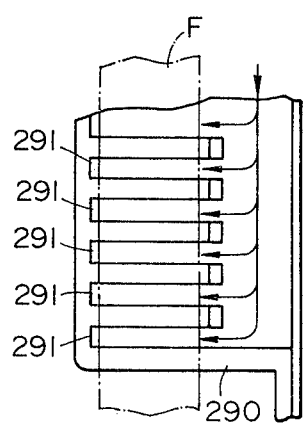
FIG. 16 is a front view of the drying chamber.

The liquid circulating pump mechanism 242 is shown in detail in FIGS. 14 and 15.

Referring to FIG. 14, a pump drive gear 265 mounted on a pump drive shaft 253 of said drive mechanism 241 is rotated, as explained in the foregoing, at a revolution equal to 1/10 of the revolution of the motor M2. The rotation of said gear 256 is transmitted, through a gear 295, to a gear 296 mounted on the shaft of and rotating integrally with a gear 297 meshing with crank shaft drive gears $298_1$, $298_2$ (FIGS. 9 and 15), the latter further meshing with a similar crank shaft drive gear $298_3$ through an intermediate gear 299. The abovementioned crank shaft drive gears $298_1$, $298_2$, $298_3$ are respectively fixed on pump drive crank shafts 300 (FIG. 15) for three pumps, whereby said crank shafts are driven by said drive mechanism 241.

Each crank shaft 300 is provided, on an end thereof, with a pin 301 in a position displaced by a distance r from the rotational center of said shaft, said pin rotatably supporting a push rod 302 of which the other end is fixed to a diaphragm 303.

Said diaphragm 303 is provided with a circular periphery shaped as an O-ring functioning as a seal between a pump upper housing 304 and a lower housing 305.

Said lower housing 305 is provided with an inlet pipe 306 and an outlet pipe 307 respectively having one-directional valves (not shown) to constitute a pump. Upon rotation of the crank shaft drive gear 298, $298_1$ the corresponding eccentric pin 301 causes the vertical reciprocating motion of the push rod 302 and the diaphragm 303, whereby the processing liquid is sucked into the inlet pipe 306 as shown by the arrow a and emitted from the outlet pipe 307 as shown by the arrow b by the function of said one-directional valves mounted on said pipes and supplied to the appropriate destination.

Figure 18:
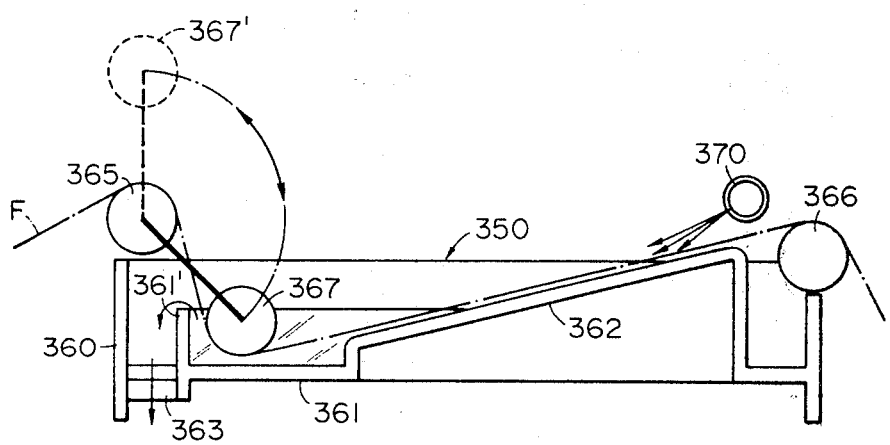
FIG. 18 is a cross-sectional view of the developing unit.

As shown in FIG. 8, the processing section 220 comprises a developing section 350 of which details are shown in FIG. 18, and rinsing sections 351, 352 which are similar in structure to said developing section 350 and are therefore omitted from the following explanation. Referring to FIG. 18, a developing tank 360 is provided with a liquid reservoir 361, a slope portion 262 and a liquid drain hole 362. Film guide rollers 365 and 366 are provided respectively at the entrance side and exit side of the developing tank, while a vertically movable film guide roller 367 is positioned normally in said liquid reservoir 361. More specifically said roller 367 is moved to the broken-lined position 367' to facilitate initial film loading into the processing section and subsequently returned to the full-lined position to guide the film through the liquid in the reservoir 361. The processing liquid supplied from the aforementioned pump mechanism is emitted from a nozzle pipe 370 toward the film F, which is guided by the rollers 365, 367, 366 from left to right with its emulsion side upwards.

The film F exposed in the camera unit is introduced, after passing through the film detector in the processor unit, into the liquid reservoir 361 in which the emulsion face is brought into uniform contact with the developer, and then the development is accelerated by the spraying of the developer by the nozzle pipe 370 onto the emulsion face of the film F on the slop portion 362. The acceleration of the development in this case is particularly marked in comparison with other developing methods since the liquid is sprayed in counter current to the advancement of the film. It is therefore rendered possible to achieve sufficient development within a relatively short distance, and thus to compactize the apparatus in comparison with the conventional apparatus for the same film advancing speed. The liquid sprayed by the nozzle pipe 370 flows down along the film surface to enter the liquid reservoir, and the liquid overflowing from the brim 361' of the liquid reservoir 361 is returned from the drain hole 363 to the liquid container 380 shown in FIG. 8 for recirculation by the pump. In FIG. 8, 381 and 382 are containers for rinsing liquid. The present embodiment employs a monobath developer for the film processing, but it is also possible to provide separate developing and fixing sections.

Again referring to FIG. 8, the photoreceptor 14 for measuring the light illuminating an object is provided with a diffusing dome 400, behind which located is a photosensor element 401 generating an electric signal corresponding to the intensity of the received light, said signal being utilized for regulating the functioning time of the shutter solenoid 132 for controlling the exposure time by the shutter 130 thereby obtaining a constant exposure to the film regardless of the eventual change in the intensity of the illuminating light, thus achieving a constant image density on the film. In front of the photosensor element there are provided polarizing filters 410, 411 of which mutual angular position is adjusted so as to obtain a constant density on the film for a standard intensity of illumination, thus compensating the eventual fluctuation in the performance of the photosensor element.

Figure 19:
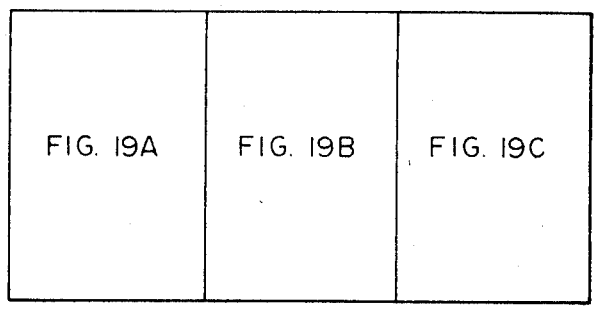
FIGS. 19 19A, 19B and 19C is a timing chart.
Figure 19A:
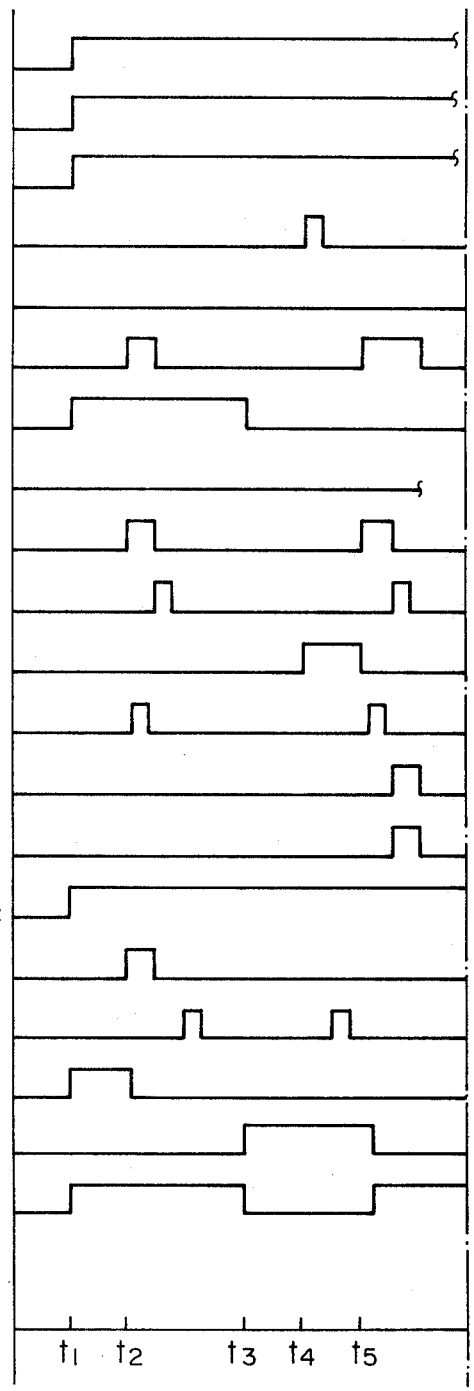
Figure 19B:
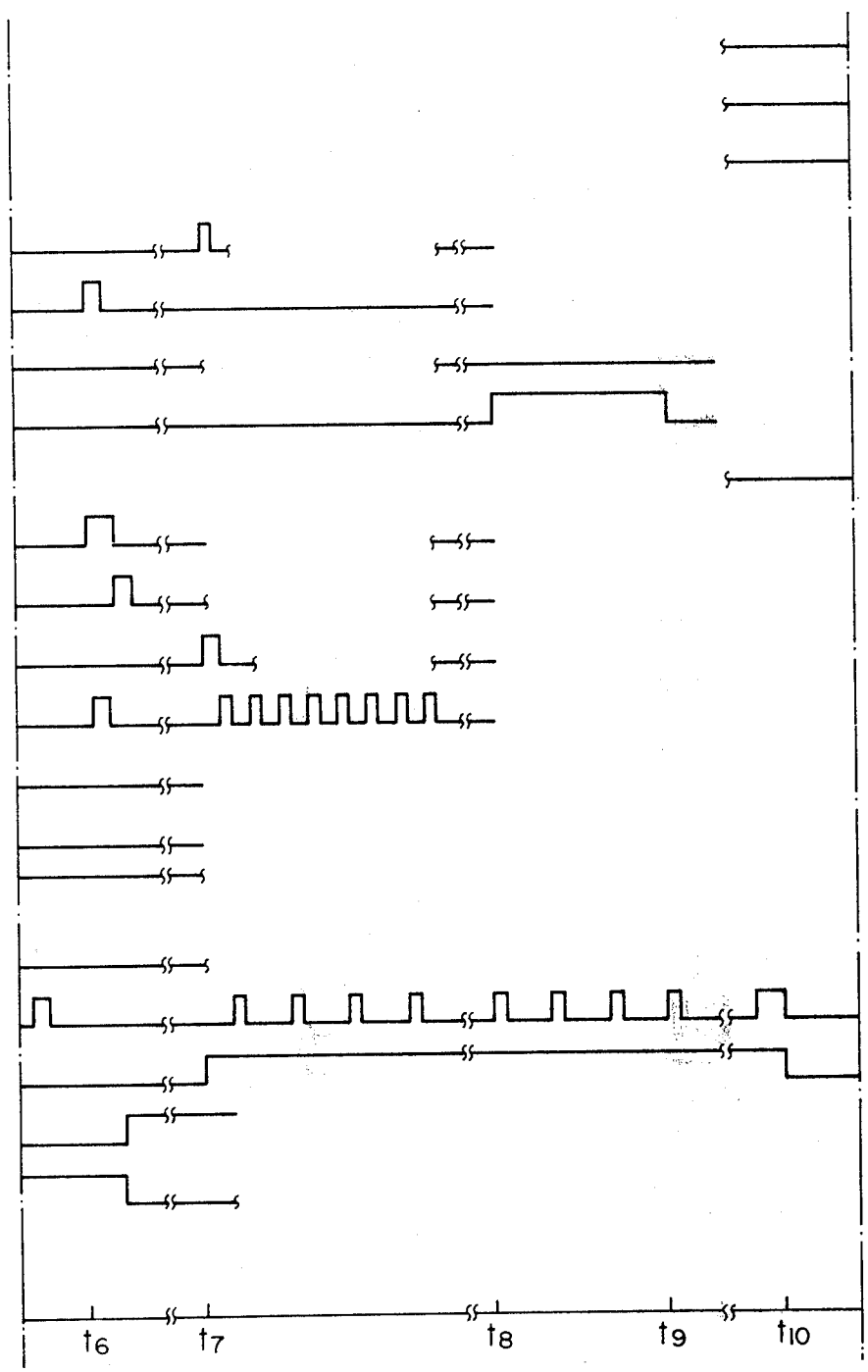
Figure 19C:
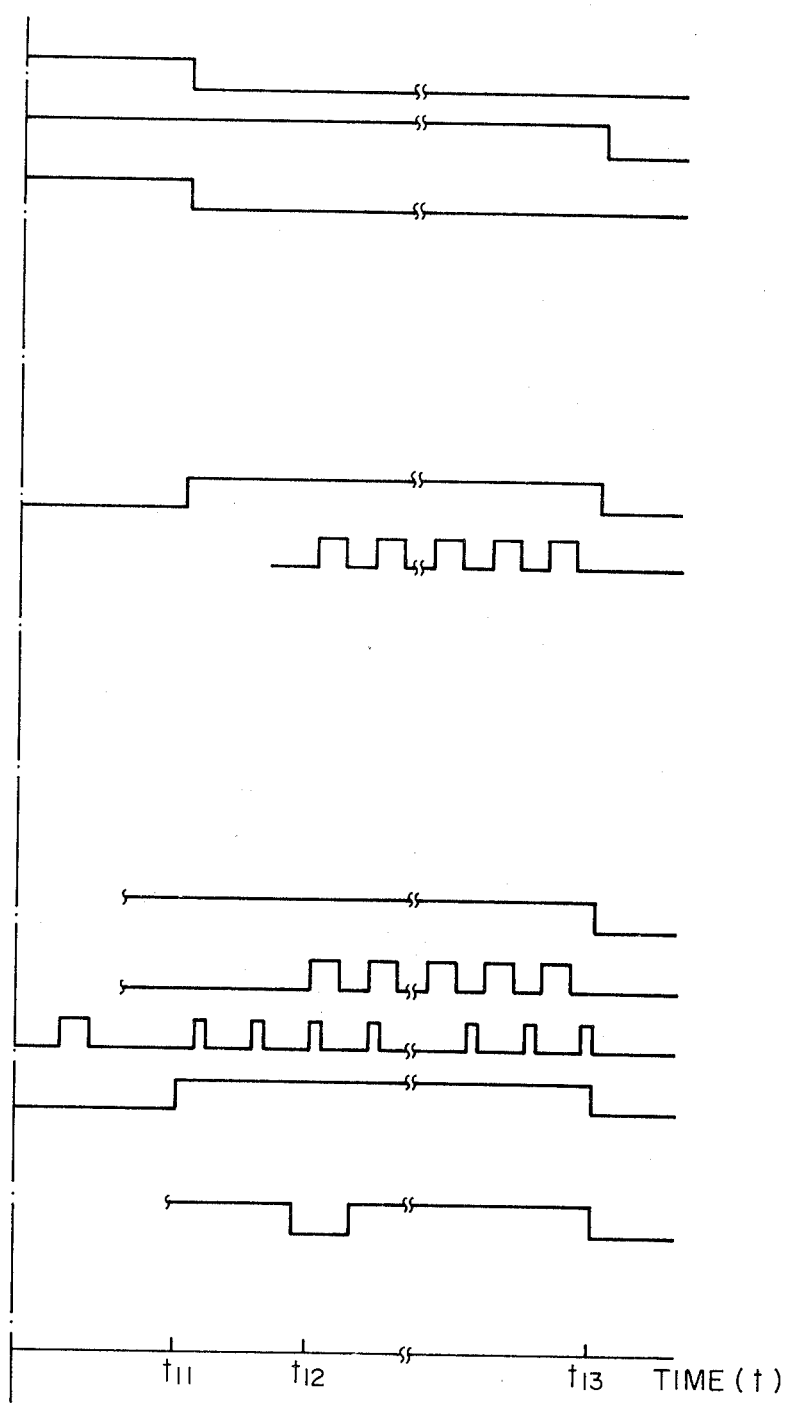

Now there will be given an explanation on the function of the above-explained camera, while making reference to the timing chart shown in FIG. 19. In the photographing-processing continuous operation mode, the camera and processor units are mounted on the support 6, and, with the lids of said units being open, the film is extracted from the film storage chamber 102 and set on the winding reel of the processor unit through the film transport path in said units. With the power switch S1 being turned on at the time t1 (FIG. 19 A), the power (FIG. 19 B) is supplied to the support, camera unit, processor unit and illuminating unit.

At the same time a weight lamp (FIG. 19 G) is lighted on the panel of the control section 11 prohibiting the shutter function until it is turned off.

In the processor unit the motor M2 is started (FIG. 19 R), whereby the film in the processor unit is initially advanced at a high speed (FIG. 19 U indicating the energization of the speed changeover solenoid shown in FIG. 11) and the liquid heater 239 is turned on (FIG. 19 W) to initiate the heating of the heating block.

At the time t2 when the film loop in the film chamber 103 of the camera unit becomes zero, the roller 229 of the film detector (FIG. 13) of the processor unit is moved upward to close the loop detecting microswitch 234 (FIG. 19 S) to deactivate the solenoid 265 (FIG. 19 U) thereby switching the advancing speed of the film from high to low. Also in response to the closure of said loop detecting microswitch 234, the drive motor M1 of the camera unit is activated to advance the film by one frame, thereby restoring the film loop and thus opening said microswitch again. At the same time a feed indicating lamp 9 on the pillar unit becomes lighted (FIG. 19 F) to indicate the advancement of the film in the camera unit. The above-mentioned program of initial high-speed drive upon turning on of the power switch and succeeding low-speed drive upon closure of the loop detecting microswitch 234 is employed for the following reason. As the amount of initial film loop present in the film chamber 103 after the film loading into the processor unit is unknown, the high-speed film drive is initially employed to rapidly bring said film loop to zero. Subsequently the film drive is switched to the low-speed mode in order to extend the time until the actuation of the microswitch 234, as otherwise said microswitch 234 is repeatedly actuated within a short time with resulting film advancements, thus leaving unnecessary unexposed frames on the film.

Then the feed switch S2 shown in FIG. 1 is actuated to automatically advance the film without exposure in order to exclude the fogged leading end portion of the film loaded in the camera unit. It is to be noted, however, that the amount of said film advancement should be modified according to whether the camera unit is used in combination with the processor unit or used alone. In case of the use of the camera unit alone, 150 frames of the film are advanced without exposure, corresponding approximately to 1.5 meters of fogged leading end portion. On the other hand, in case of the use in combination with the processor unit, the advancement of 25 frames corresponding approximately to 0.25 meters is enough since the distance from the exposure section of the camera unit to the winding reel of the processor unit is approximately equal to 1.5 meters. This amount of advancement is automatically modified by electric identification whether the processor unit 2 is mounted or not.

Then at the time t3 when the temperature of the developer reaches a predetermined value (30°-32° C.), a thermal switch 240 releases an electrical signal (FIG. 19V) to terminate the power supply to the liquid heater 239 (FIG. 19 W), which is thereafter on-off controlled by the signal from said thermal switch.

At the same time the weight lamp is turned off (FIG. 19 G) whereby the shutter function being enabled and the exposure being thus rendered possible by the shutter switch S1. The processor unit 2 continues to advance the film at the low speed, the feed detecting microswitch 279 shown in FIG. 10 generating a pulse signal (FIG. 19 T) for each advancement of a determined amount.

When the shutter switch S is actuated (FIG. 19 D) at the time t4, the shutter solenoid 132 is activated (FIG. 19 L) in response to the intensity of light received by the photosensor element 401 of the photoreceptor 4 to expose the film to the object. Upon closing of the shutter, the drive motor M of the camera unit is activated (FIG. 19 J) whereby the capstan roller 113' performs a 1/6 rotation to advance the film by a frame.

Successively in response to a signal from the motor stop detection switch 157 (FIG. 19 K) the motor M is stopped to terminate the advancement of the film. Also said signal lights the lamps for mark and frame number recording 128, 138 (FIG. 19 P, Q) to record the mark and the frame number of the film. These recordings are however not conducted when the switch S4 on the control panel is turned off. During the film advancement and also during the function of said lamps for recording the mark and frame number the feed indicating lamp 9 is lighted (FIG. 19 F) to prohibit the shutter function. Also in response to the film advancement by the capstan roller, the microswitch 75 releases a film feed signal (FIG. 19 M) indicating the feeding of one frame of the film. The above explained procedure is repeated each time the shutter switch is actuated.

At the start of photographing the film advancing speed of the processor unit is changed from high speed to low speed. Thus, if the exposures are conducted at a faster speed than the feeding speed of the processor unit, the amount of film present in the film storage chamber 103 increases by the difference between the film supply from the camera unit and the film winding in the processor unit. When said amount exceeds a predetermined value (selected as 150 frames in the present embodiment), the speed changeover solenoid 265 in FIG. 11 is actuated (FIG. 19 U, at time t7) to rotate the film drive rollers 275, 276 at high speed, thereby advancing the film at high speed until the amount of film in the film chamber becomes less than 150 frames. In case the exposures are conducted during this period at a speed lower than the film advancing speed of the processor unit, the amount of film looped in said film chamber becomes less than 150 frames to return the advancing speed back to the low speed mode. On the other hand when the exposures are conducted at a speed higher than the film advancing speed of the processor unit, the amount of film looped in the film chamber gradually increases, and the weight exhibiting lamp is lighted at time t8 to forbid the shutter function when said amount exceed 200 frames, beyond which the film may be damaged. The processor continues to advance the film at the high speed, whereby the amount of said looped film gradually decreases. When said amount reaches 190 frames (at the time t9), the weight lamp is extinguished to enable the shutter function again. Thereafter the procedure of t4 - t7, t7 - t8 or t8 - t9 is selectively conducted according to the interval of the operations of the shutter switch S1. In case the exposure operation is interrupted for a certain period, the film loop gradually decreases and finally becomes zero. When the loop is completely removed, the loop detecting microswitch 234 in FIG. 12 is actuated (FIG. 19 S) to activate the drive motor M thereby advancing the film by one frame. The signal from said microswitch 234 is also utilized for resetting a counter for measuring the amount of loop by counting and comparing the number of the signals from the microswitch 279 of the processor unit (FIG. 10; FIG. 19 T) and from the feed detecting switch 175 of the camera unit.

Although said microswitches 175, 279 are designed to generate electric signals for every film advancement of 10 mm, the counter is reset to zero by the microswitch 234 when the amount of looped film becomes actually zero since certain error is inevitable between the calculated amount and the actual amount of loop. The above-mentioned counting operation is naturally conducted not only in the film advancement by the shutter switch S1 but also in that by the space switch S7 or by the feed switch S2. As explained in the foregoing, the present invention is featured by storing the film in loops in the film chamber of the camera unit and calculating the amount of said loop from the comparison of the film feeding in the camera unit and the film feeding the processor unit to changing the film advancing speed in the processor, with corresponding change of the processing speed.

When the power switch S1 is turned off at the time t11 the illuminating lamp 15 is extinguished and the auto-stop lamp on the panel of the control section is lighted to indicate the auto-stop state.

At the same time the processor is switched to high speed film feeding, thereby the film is taken up on the winding reel 285 at the high speed. In case the processor is in the state of high speed film feeding when the power switch S1 is turned off, the processor continues said state. In case the film loop is present in the film chamber of the camera unit, the loop detecting switch 234 is not actuated until said loop is removed. When the loop becomes zero at the time t 12, the microswitch 234 is actuated to activate the motor M of the camera unit thereby advancing the film by one frame. This procedure is thereafter repeated approximately 150 times, i.e. until the finally exposed frame on the film reaches the winding reel 285 of the processor unit. The amount of film advancement is calculated by counting the number of pulses from the film feed detecting microswitch 279, and, upon counting of 150 pulses (FIG. 19 T) since the first actuation of the microswitch 234 after the power switch S1 is turned off, the entire power supply to the camera and processor units is automatically cut off at the time t13.

In case the amount of loop is zero when the power switch is turned off, the detecting microswitch 234 immediately initiates function, and the power supply is cut off after the film feed detecting microswitch 279 counts the function of said microswitch 234 150 times. The above-explained automatic stop function is designed to continue the function of the camera and processor units, after the termination of exposures, until the finally exposed frame is completely developed, rinsed and dried, and to automatically terminate the power supply thereafter, whereby the user is capable of completing the processing and cutting of the power supply thereafter by simply turning off the power switch after the photographing of the desired objects.

As explained in the foregoing, the apparatus of the present invention can be utilized as a processor-camera for continuous photographing and processing when the camera unit and the processor unit are mounted on the support.

Also in case said apparatus is utilized as a camera for photographing only, the processor unit is detached from the support, the adaptor 117 is mounted on the drive shaft 118 of the film chamber 103, and a winding reel R is mounted on said adaptor 117. The connecting tube 106 is capped to protect the film chamber 103 from the external light. Prior to the start of photographing operation, the film is extracted from the film storage chamber 102 and threaded to the winding reed R in the film chamber 103. In response to the photoggraphing operation as explained in the foregoing, the exposed film is automatically taken up on said winding reel R. This operation mode is particularly useful for example when the film used does not match with the developer of the processor, or when it is desirable to prevent the loss of film in case a color film is wed and the film is developed by other developing machine or the photographing operation is to be interrupted for a prolonged period.

What we claim is:

1. A photographic apparatus provided with a camera for photographing image originals on a photographic film and processing means for developing the exposed film, said camera comprising:
   (a) lens means for projecting images on said originals onto said film;
   (b) a storage chamber for storing exposed film therein, said storage chamber defining a space of a size sufficient to accumulate therein a certain amount of said exposed film in its unwound state, and for accommodating therein a take-up reel;
   (c) holding means for detachably holding said take-up reel in said storage chamber;
   (d) driving means for rotating said take-up reel when held by said holding means so as to take up said exposed film on said take-up reel; and
   (e) a film conveying path formed between said storage chamber and said processing means for forwarding the film stored in the space of said storage chamber in its unwound state to said processing means.

2. A photographic apparatus according to claim 1, wherein said holding means includes a shaft which is detachably connected to said driving means, and wherein said take-up reel is coupled with said driving means through said shaft.

3. A photographic apparatus according to claim 1, wherein said camera and said processing means are detachably connected.

4. A photographic apparatus according to claim 1, further comprising a support member including means for generating drive signals for controlling said camera and said processing means and a switch for instructing the photographing operation, said camera and said processing means being detachably mountable on said support member and being controlled by said control signals when mounted on said support member.

5. A processor-camera for photographing originals successively on a film and subsequently developing the thus exposed film, comprising:
 a base member having a face for placing originals thereon;
 a camera unit detachably mountable on said base member and comprising a film storage chamber, lens means, a film chamber capable of storing said film in a looped state, means for advancing the film from the film storage chamber through the exposure position of said lens means to said film chamber, and a film transport path for guiding the film in said film chamber to the outside of said camera unit; and
 a processor unit detachably mountable on said base member and comprising developing means, fixing means, drying means, and a film transport path for guiding the film supplied from outside of said processor unit to said developing means.

6. A processor-camera according to claim 5, further comprising a lamp unit for illuminating said original-supporting face of the base member, said lamp unit being detachably mountable on said base member.

7. A microfilm camera, comprising:
 (a) a base body having an image original mounting surface, operating switches, control circuits, and electrical connectors electrically connected to said control circuits;
 (b) a photo-taking camera having therein a camera lens system, film forwarding means, means defining a film exit, and connectors connectable with said electrical connectors in said base body, wherein said photo-taking camera receives control signals to control its operations from said control circuits in said base body through said electrical connectors in said base body and said connectors in said photo-taking camera when said camera is mounted at a predetermined position of said base body; and
 (c) a processor having therein developing means, means for receiving developed film, film forwarding means, means defining a film inlet, and connectors connectable with said electrical connectors in said base body, wherein said processor is detachably mountable on said base body at a predetermined position and, when mounted, is connected at its film inlet with said photo-taking camera at the film outlet of said camera and receives control signals to control the operations of said processor from said control circuits through said electrical connectors of said base body and said connectors of said processor.

8. A microfilm camera according to claim 7, wherein said photo-taking camera includes a storage chamber for storing exposed film therein and a film conveying path formed between said storage chamber and said film exit, and wherein said storage chamber defines a space of a size sufficient to accumulate therein a certain amount of said exposed film in its unwound state.

9. A microfilm camera according to claim 8, wherein said photo-taking camera further includes holding means detachably mounted in the space of said storage chamber for holding a film take-up reel, and driving means to rotate said take-up reel held on said holding means so as to take up said exposed film on said film take-up reel.

10. A microfilm camera according to claim 8, wherein said processor further comprises means for changing the film forwarding speed, said speed changing means being controlled in accordance with the film quantity in the space of said storage chamber.

11. A microfilm camera according to claim 7, further comprising a feeding switch, means for driving said film forwarding means in said photo-taking camera to advance film in said camera in a predetermined quantity in accordance with the operation of said feeding switch, and means for changing said predetermined quantity of film depending on whether or not said processor is attached to said base body.

12. A microfilm camera according to claim 8, further comprising means for detecting the quantity of film staying in said storage chamber, wherein the photo-taking operations of said camera are controlled in accordance with the detecting signal of said detecting means.

* * * * *

UNITED STATES PATENT AND TRADEMARK OFFICE
CERTIFICATE OF CORRECTION

PATENT NO. : 4,259,007
DATED : March 31, 1981
INVENTOR(S) : TOSHIO ARAI, ET AL.

It is certified that error appears in the above-identified patent and that said Letters Patent are hereby corrected as shown below:

Column 2, line 68, before "photographing" insert --a--;

Column 10, line 49, "154" should read --254--;

Column 11, line 16, "180" should read --280--;
line 38, "said" should read --and--;
line 65, "265" should read --256--;

Column 12, line 38, "262" should read --362--;
line 39, "362" should read --363--;

Column 17, line 12, Claim 4, "Claim 9" should read --Claim 1--.

Signed and Sealed this

Third Day of November 1981

[SEAL]

Attest:

GERALD J. MOSSINGHOFF

Attesting Officer

Commissioner of Patents and Trademarks